US008828482B1

(12) United States Patent  
Ruffini et al.

(10) Patent No.: US 8,828,482 B1  
(45) Date of Patent: Sep. 9, 2014

(54) ELECTROLESS COATED DISKS FOR HIGH TEMPERATURE APPLICATIONS AND METHODS OF MAKING THE SAME

(71) Applicants: Western Digital Technologies, Inc., Irvine, CA (US); Coventya, Inc., Brooklyn Heights, OH (US)

(72) Inventors: Alan J. Ruffini, Lebanon, NJ (US); Lindsey A. Hamilton, San Jose, CA (US); Dorothea Buechel-Rimmel, San Jose, CA (US); Jean M. Laplante, Oriskany, NY (US); Ambrose Schaffer, Canajoharie, NY (US); Frederick K. Lowes, Vernon Center, NY (US)

(73) Assignee: WD Media, LLC, San Jose, CA (US)

( * ) Notice: Subject to any disclaimer, the term of this patent is extended or adjusted under 35 U.S.C. 154(b) by 0 days.

(21) Appl. No.: 13/783,660

(22) Filed: Mar. 4, 2013

Related U.S. Application Data

(62) Division of application No. 12/849,783, filed on Aug. 3, 2010, now Pat. No. 8,404,369.

(51) Int. Cl.
*G11B 5/84* (2006.01)
*G11B 5/706* (2006.01)
*G11B 5/65* (2006.01)
*G11B 5/66* (2006.01)

(52) U.S. Cl.
CPC ............... *G11B 5/65* (2013.01); *G11B 5/8404* (2013.01); *G11B 5/66* (2013.01)
USPC ........... 427/127; 427/438; 427/305; 205/187; 428/832.3

(58) Field of Classification Search
CPC .......... G11B 5/653; G11B 5/66; G11B 5/858; G11B 5/8404; G11B 5/65; G11B 5/738; G11B 5/852
USPC ......... 427/130, 131, 132, 258, 269, 305, 405, 427/438, 430.1, 431, 205, 435, 436, 419.1, 427/99.5, 30, 419.11; 205/80, 81, 258, 126, 205/187; 428/832, 831, 831.2, 831.1, 428/846.7, 827, 828, 836.1, 46.2, 828.1; 360/59, 136, 135; 438/23; 204/192.2
See application file for complete search history.

(56) References Cited

U.S. PATENT DOCUMENTS 4,567,066 A * 1/1986 Schultz et al. ................ 427/305
4,659,605 A   4/1987 Malik et al.

(Continued)

OTHER PUBLICATIONS

Hsu, J and Lin, K (2005). "The effect of saccharin addition on the mechanical properties and fracture behavior of IL. FJ electroless Ni—Cu—P deposit on Al". Thin Solid Films 471, p. 186-193.
Hsu, J (2003). "Effect of internal stress on elemental diffusion and crystallization of electroless Ni—Cu—P deposit on Al". Journal of materials research (0884-2914), 18 (9), p. 2221.

(Continued)

*Primary Examiner* — Kevin M. Bernatz
*Assistant Examiner* — Louis Falasco

(57) ABSTRACT

A disk for a hard disk drive is provided. The disk comprises a substrate comprising aluminum, and a coating layer disposed over the substrate. The coating layer comprises an alloy of Ni, $X_1$ and $X_2$, wherein $X_1$ comprises one or more elements selected from the group consisting of Ag, Au, B, Cr, Cu, Ga, In, Mn, Mo, Nb, Pb, Sb, Se, Sn, Te, W, Zn and Zr, and wherein $X_2$ comprises either B or P, and wherein $X_1$ and $X_2$ do not comprise the same elements.

15 Claims, 1 Drawing Sheet

(56) References Cited

U.S. PATENT DOCUMENTS

| | | | |
|---|---|---|---|
| 5,091,225 A * | 2/1992 | Goto | 427/131 |
| 5,314,745 A | 5/1994 | Okumura | |
| 5,437,779 A * | 8/1995 | Shige et al. | 204/192.2 |
| 5,480,733 A | 1/1996 | Okumura et al. | |
| 5,744,256 A * | 4/1998 | Goda et al. | 428/828.1 |
| 6,106,927 A * | 8/2000 | Zhong et al. | 428/141 |
| 6,143,375 A * | 11/2000 | Ross et al. | 427/130 |
| 6,316,097 B1 | 11/2001 | Liu et al. | |
| 6,524,724 B1 | 2/2003 | Cheng et al. | |
| 6,620,531 B1 | 9/2003 | Cheng | |
| 6,680,133 B2 | 1/2004 | Sakawaki et al. | |
| 6,709,561 B1 * | 3/2004 | Pavlov et al. | 205/81 |
| 6,986,956 B2 | 1/2006 | Nanis | |
| 7,255,942 B2 | 8/2007 | Liu et al. | |
| 7,361,419 B2 | 4/2008 | Uwazumi et al. | |
| 7,407,720 B2 | 8/2008 | Girt et al. | |
| 8,404,369 B2 | 3/2013 | Ruffini et al. | |
| 2002/0048692 A1 | 4/2002 | Hosokawa et al. | |
| 2002/0071968 A1 * | 6/2002 | Liu et al. | 428/831 |
| 2002/0146594 A1 | 10/2002 | Takahashi et al. | |
| 2003/0059648 A1 | 3/2003 | Akimoto et al. | |
| 2004/0031694 A1 * | 2/2004 | Feng | 205/258 |
| 2004/0161635 A1 * | 8/2004 | Liu et al. | 428/692 |
| 2005/0048328 A1 | 3/2005 | Bian et al. | |
| 2005/0123805 A1 | 6/2005 | Shimizu et al. | |
| 2006/0019122 A1 | 1/2006 | Kawano et al. | |
| 2006/0222903 A1 | 10/2006 | Ichihara et al. | |
| 2007/0117234 A1 | 5/2007 | Fork et al. | |
| 2008/0206601 A1 * | 8/2008 | Mukai | 428/831 |
| 2009/0040644 A1 | 2/2009 | Lu et al. | |
| 2009/0130346 A1 | 5/2009 | Osawa et al. | |
| 2009/0280357 A1 | 11/2009 | Girt et al. | |
| 2010/0046116 A1 * | 2/2010 | Shimizu et al. | 428/800 |
| 2010/0188772 A1 * | 7/2010 | Sasaki et al. | 428/832.1 |

OTHER PUBLICATIONS

Hsu, J (2003). "Enhancement in the Deposition Behavior and Deposit Properties of Electroless Ni—Cu—P". Journal of the Electrochemical Society (0013-4651), 150 (9), p. C653.

K. Lin, Y. Chang, C. Huang, F. Li, and J. Tsu (2001). "Microstructure evolution of electroless Ni—P and Ni—Cu—P deposits on Cu in the presence of additives." Applied Surface Science, vol. 181, Issues 1-2, Sep. 3, 2001, p. 166-172.

Chen, C (1999). "The deposition and crystallization of behaviors of electroless Ni—Cu—P deposits". Journal of the Electrochemical Society (0013-4651), 146 (1), p. 137.

Georgieva, J and Armyanov, S (2007). "Electroless deposition and some properties of Ni—Cu—P and Ni—Sn—P coatings". Journal of Solid State Electrochemistry, vol. 11, No. 7/Jul. 2007, p. 869-876.

Georgieva, J (2003). "Factors Affecting the Electroless Deposition of Ni—Cu—P Coatings". Journal of the Electrochemical Society (0013-4651),150 (11), p. C760.

D. Tachev, J. Georgieva, and S. Armyanov (2001). "Magnetothermal study of nanocrystalline particle formation in amorphous electroless Ni—P and Ni—Me—P alloys". Electrochemica Acta 47, p. 359-369.

Valova, E (2005). "Interface between electroless amorphous Ni—Cu—P coatings and Al substrate". Surface & coatings technology (0257-8972), 190 (2-3), p. 336.

Krasteva, N (1995). "Thermal-Stability of Electroless Nimep Amorphous-Alloys". Journal of electronic materials (0361-5235), 24 (8), p. 941.

Krasteva, N (1994). "Thermal-Stability of Ni—P and Ni—Cu—P Amorphous Alloys". Journal of the Electrochemical Society (0013-4651),141 (10), p. 2864.

Armyanov, S (1999). "Electroless deposition of Ni—Cu—P alloys in acidic solutions". Electrochemical and solid-state letters (1099-0062), 2 (7), p. 323.

Yu, H (2001). "A comparative study on the crystallization behavior of electroless Ni—P and Ni—Cu—P deposits". Surface and coatings technology (0257-8972), 148(2-3), p. 143.

Cherkaoui, M (1992). "Electroless Deposition of Ni—Cu—P Alloys". Plating and surface finishing (0360-3164),79 (11), p. 68.

Chassing, E (1993). "Electrochemical Investigation of the Autocatalytic Deposition of Ni—Cu—P Alloys". Journal of applied electrochemistry (0021-891X), 23 (11), p. 1169.

R. Touir, H. Larhzil, M. Ebntouham, M. Cherkaoui and E. Chassaing (2006). "Electroless deposition of copper in acidic solutions using hypophosphite reducing agent". Journal of Applied Electrochemistry (2006),36, p. 69-75.

H. Larhzil, M. Cisse, R. Touir, M. Ebntouhami, and M. Cherkaoui (2007). "Electrochemical and Sem investigations of the influence of gluconate on the electroless deposition of Ni—Cu—P alloys". Electrochimica Acta D vol. 53, Issue 2, 1 Dec. 2007, p. 622-628.

Ashassi-Sorkhabi, H (2004). "Effect of coating time and heat treatment on structures and corrosion characteristics of electroless Ni—P alloy depOSits". Surface & coatings technology (0257-8972), 176 (3), p. 318.

H. Ashassi-Sorkhabia, H. Dolatia, N. Parvini-Ahmadib, and J. Manzoori (2002). "Electroless deposition of Ni—Cu—P alloy and study of the influences of some parameters on the properties of deposits". Applied Surface Sciences 185 (2002), p. 155-160.

Wang, Y (1992). "Structure and Corrosion Resistance of the Electroless Ni—Cu—P". Plating and surface finishing (0360-3164),79 (3), p. 57.

Cy. Lee, Th. Huang, and Sc. Lu (1998). "Diffusion barrier properties of electroless Ni for electroless Cu using Cu plating employing hypophosphite as a reducing agent". Journal of Materials Science-Materials in Electronics, vol. 9, Issue: 5, p. 337-346.

Shimauchi, H (1994). "Preparation of Ni—Sn Alloys by an Electroless-Deposition Method". Journal of the Electrochemical Society (0013-4651),141 (6), p. 1471.

J.N. Balaraju, Kalavati, and K.S. Rajam (2009). "Surface morphology and structure of electroless ternary NiWP deposits with various W and P contents." Journal of Alloys and Compounds, vol. 486, Issues 1-2, Nov. 3, 2009, p. 468-473.

J.N. Balaraju, V. Ezhil Selvi, V.K. William Grips, K.S. Rajam (2006). "Electrochemical studies on electroless ternary and quaternary Ni—P based alloys". Electrochimica Acta 52, p. 1064-1074.

J.N. Balaraju, and K.S. Rajam (2004). "Electroless deposition of Ni—Cu—P, Ni—W—P and Ni—W—Cu—P alloys". Surface & Coatings Technology 195, p. 154-161.

J.N. Balaraju, S. Millath Jahan, A. Jain and K.S. Rajam (2007). "Structure and phase transformation behavior oh electroless Ni-P alloys containing tin and tungsten". Journal of Alloys and Compounds vol. 436, Issues 1-2, Jun. 14, 2007, p. 319-327.

Balaraju, J (1999). "Preparation and characterization of electroless Ni—P and Ni—P—Si3N4 composite coatings". Transactions of the Institute of Metal Finishing (0020-2967), 77, p. 84.

Balaraju, J (2006). "Influence of particle size on the microstructure, hardness and corrosion resistance of electroless Ni—P—Al2O3 composite coatings". Surface & coatings technology (0257-8972), 200 (12-13), p. 3933.

IN. Balaraju, SM. Jahan, A. Jain, and KS. Rajam (2005). "Structure and phase transformation behavior of electroless Ni—P alloys containing tin and tungsten". Journal of Alloys and Compounds, 436 (1-2). p. 319-327.

S.S. Mahmoud, F. El-Hameed, S.M. Abo, and M.M. Ahmed (2008). "Electroless deposition of nano-crystalline Ni—31 P based coatings on carbon steel substrates and their use as electrodes in the electrocatalytic degradation of some dyes". Journal of Alloys and Compounds, In Press, Corrected Proof.

Z. Bangwei, and X. Haowen (2000). "Effect of alloying elements on the amorphous formation and corrosion resistance of electroless Ni—P based alloys". Materials Science and Engineering: A, vol. 281, No. 1, Apr. 15, 2000, p. 286-291 (6).

Office Action dated Dec. 16, 2011 from U.S. Appl. No. 12/849,783, 12 pages.

Office Action dated May 8, 2012 from U.S. Appl. No. 12/849,783, 18 pages.

Notice of Allowance dated Nov. 26, 2012 from U.S. Appl. No. 12/849,783, 9 pages.

* cited by examiner

US 8,828,482 B1

ELECTROLESS COATED DISKS FOR HIGH TEMPERATURE APPLICATIONS AND METHODS OF MAKING THE SAME

REFERENCE TO RELATED APPLICATIONS

This application is a divisional of U.S. patent application Ser. No. 12/849,783, filed Aug. 3, 2010, entitled "ELECTROLESS COATED DISKS FOR HIGH TEMPERATURE APPLICATIONS AND METHODS OF MAKING THE SAME", the entire content of which is incorporated herein by reference.

FIELD OF THE INVENTION

The present disclosure generally concerns hard disk drives and, in particular, concerns electroless coated disks for high temperature applications and methods of making the same.

BACKGROUND OF THE INVENTION

Disks used in hard drive media frequently include an aluminum-magnesium (AlMg) substrate that is plated with a material such as nickel-phosphorous (NiP) to provide a smooth surface on which to deposit magnetic recording layers upon which data may be stored. To accommodate the growing demand for increased data storage space, future hard disk drives may utilize technologies such as EAMR (Energy Assisted Magnetic Recording), which require magnetic recording layers with high magnetic anisotropy ($K_u$). Such magnetic recording layers may include alloys that require deposition temperatures in excess of 300° C. The Ni—P coating currently used to provide smooth surfaces on which to deposit the magnetic recording layer, however, cannot withstand temperatures this hot, without dramatically increasing in surface roughness.

SUMMARY OF THE INVENTION

Various embodiments of the present invention solve the foregoing problem by providing aluminum disks with a coating layer having increased thermal stability for use with high Ku magnetic recording layers.

According to one aspect of the subject disclosure, a disk for a hard disk drive comprises a substrate comprising aluminum, and a coating layer disposed over the substrate. The coating layer comprises an alloy of Ni, $X_1$ and $X_2$, wherein $X_1$ comprises one or more elements selected from the group consisting of Ag, Au, B, Cr, Cu, Ga, In, Mn, Mo, Nb, Pb, Sb, Se, Sn, Te, W, Zn and Zr, and wherein $X_2$ comprises either B or P, and wherein $X_1$ and $X_2$ do not comprise the same elements.

According to another aspect of the subject disclosure, a method of forming a disk for a hard disk drive comprises steps of providing a substrate comprising aluminum, disposing a zincate layer over the substrate, and electroless plating a coating layer over the zincate layer. The coating layer comprises an alloy of Ni, $X_1$ and $X_2$, wherein $X_1$ comprises one or more elements selected from the group consisting of Ag, Au, B, Cr, Cu, Ga, In, Mn, Mo, Nb, Pb, Sb, Se, Sn, Te, W, Zn and Zr, and wherein $X_2$ comprises either B or P, and wherein $X_1$ and $X_2$ do not comprise the same elements.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
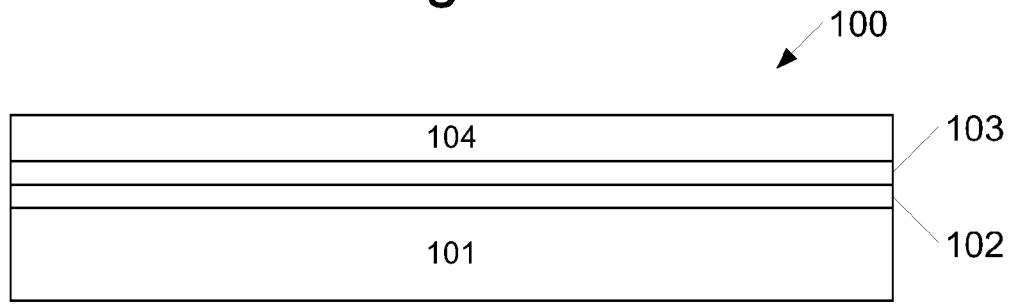
FIG. 1 illustrates a disk for use in a hard disk drive according to one aspect of the subject disclosure.

FIG. 1 illustrates a disk 100 for use in a hard disk drive according to one aspect of the subject disclosure, including a substrate 101 comprising aluminum and a coating layer 103 disposed over the substrate. Substrate 101 may comprise, for example, an alloy of aluminum (Al) and magnesium (Mg). Coating layer 103 comprises an alloy of Ni, $X_1$ and $X_2$, where $X_1$ comprises one or more elements selected from the group consisting of silver (Ag), gold (Au), boron (B), chromium (Cr), copper (Cu), gallium (Ga), indium (In), manganese (Mn), molybdenum (Mo), niobium (Nb), lead (Pb), antimony (Sb), selenium (Se), tin (Sn), tellurium (Te), tungsten (W), zinc (Zn) and zirconium (Zr), and $X_2$ comprises either B or phosphorous (P), and where $X_1$ and $X_2$ do not comprise the same elements. In accordance with one aspect of the subject disclosure, the coating layer may be between about 1 and 20 μm in thickness.

According to one aspect of the subject disclosure, disk 100 may further comprise a zincate layer 102 disposed between substrate 101 and coating layer 103. Zincate layer 102 provides a barrier that may help to prevent aluminum substrate 101 from becoming oxidized. According to another aspect of the subject disclosure, disk 100 may further comprise a magnetic recording layer 104 disposed over coating layer 103. Magnetic recording layer 104 may comprise a material that may require a high temperature (e.g., over 300° C.) deposition process, including, for example, one or more of Fe, Pt, Sm and Co.

According to certain aspects of the subject disclosure, polished AlMg/Ni—$X_1$—$X_2$ disks enjoy increased thermal stability when compared to conventional NiP-coated AlMg disks. For example, the addition of Cu to a NiP coating alloy helped to quench the magnetism of Ni which develops in the conventional NiP coating at higher temperatures (e.g., higher than 340° C.) due to the crystallization and crystal growth of Ni. In this regard, in accordance with one aspect of the subject disclosure, $X_1$ may comprise Cu and another element such as, for example, an element selected from the group consisting of B, In, Mo, Sn and W. Accordingly, example, the alloy may be a quaternary alloy such as Ni—Cu—In—P (i.e., where $X_1$ comprises Cu and In and $X_2$ comprises P), Ni—Cu—Mo—P (i.e., where $X_1$ comprises Cu and Mo and $X_2$ comprises P), or Ni—Cu—B—P (i.e., where $X_1$ comprises Cu and B and $X_2$ comprises P), according to certain aspects of the subject disclosure.

In accordance with one aspect of the subject disclosure, the alloy may include between about 30 and about 70 weight percent Ni, and between about 3 and about 11 weight percent $X_2$. Each constituent of $X_1$ may represent about 1.5 weight percent up to about 42 weight percent of the alloy.

According to one aspect of the subject disclosure, the coating layer may have a roughness $R_a$ of less than about 0.5 nm when measured by atomic force microscopy after polishing. Because of the improved thermal stability of the coating layer, it may maintain a roughness $R_a$ of less than about 1.0 nm when measured by atomic force microscopy after being heated to about 450° C., in accordance with one aspect of the subject disclosure.

Figure 2:
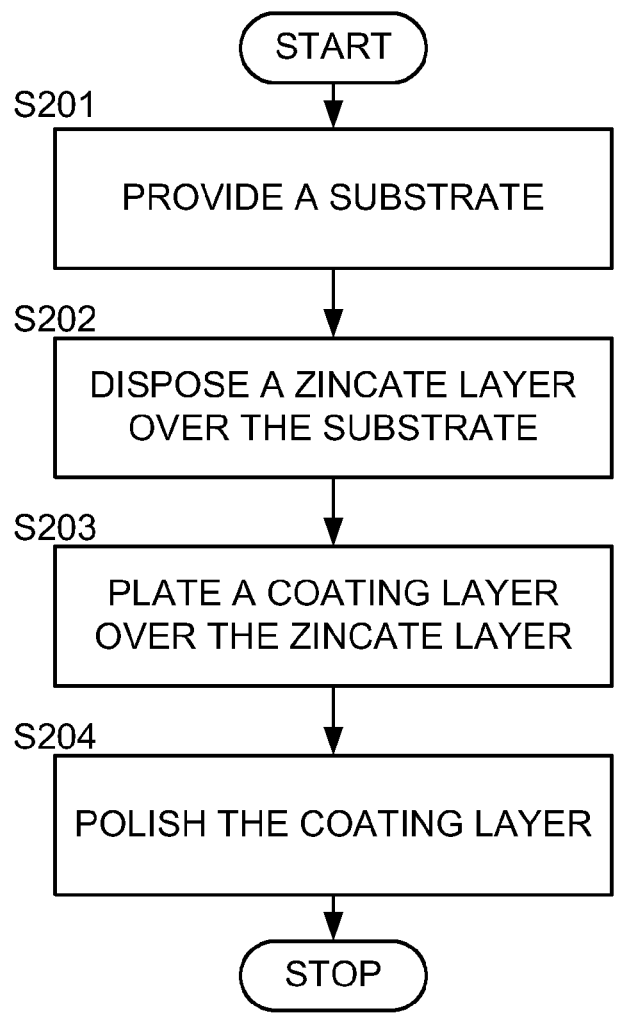
FIG. 2 is a flow chart illustrating a method of forming a disk for a hard disk drive in accordance with one aspect of the subject disclosure.

FIG. 2 is a flow chart illustrating a method of forming a disk for a hard disk drive in accordance with one aspect of the subject disclosure. The method begins with step 201, in which a substrate comprising aluminum is provided. In step 202, a zincate layer is disposed over the substrate. In accordance with one aspect of the subject disclosure, the zincate layer may be deposited in an alkaline bath in high ph conditions. Alternatively, the zincate layer may be deposited via an acid zinc immersion process.

In step 203, a coating layer is provided over the zincate layer via electroless plating. The coating layer comprises an alloy of Ni, $X_1$ and $X_2$, where $X_1$ comprises one or more elements selected from the group consisting of Ag, Au, B, Cr, Cu, Ga, In, Mn, Mo, Nb, Pb, Sb, Se, Sn, Te, W, Zn and Zr, $X_2$ comprises either B or P, and where $X_1$ and $X_2$ do not comprise the same elements. The step of electroless plating the coating layer may comprise disposing the substrate in a plating bath comprising one or more metal sources for each of Ni and $X_1$, a reducing agent for reducing the one or more metal sources, the reducing agent comprising $X_2$, one or more complexors to reduce metal precipitation, one or more stabilizers, and one or more pH adjusting additives.

The plating bath may have a pH of between about 5 and about 9, in accordance with one aspect of the subject disclosure. This range of pH may allow the implementation of each constituent of $X_1$ from about 1.5 weight percent up to about 42 weight percent. According to another aspect of the subject disclosure, the plating bath may be maintained at a temperature between about 160° F. and about 195° F. while the substrate is disposed in the plating bath.

In accordance with one aspect of the subject disclosure, the plating bath may have a metal turn over (MTO) of less than 6. For example, according to one aspect of the subject disclosure, the MTO of the plating bath may be maintained between about 2.0 and 4.5. Maintaining the MTO within these levels allows for an economic plating performance and consistently reproducible plating results. Over the life time of the plating bath, dialysis of the orthophosphite in the bath may be utilized to keep the orthophosphite concentration stable.

In accordance with one aspect of the subject disclosure, the one or more metal sources for Ni may comprise one or more of nickel sulfate, nickel sulfamate, nickel acetate, nickel chloride, nickel hypophosphite, and nickel fluor-borate. According to another aspect of the subject disclosure, the one or more metal sources for $X_1$ may comprise one or more of copper sulfate, copper iodate, copper iodide, copper chloride, indium citrate, indium sulfate, indium acetate, molybdic acid, ammonium molybdate, sodium molybdate, ammonium tungstate, sodium tungstate, and indium chloride.

The reducing agent may comprise one or more of salts of hypophosphite, nickel hypophosphite, dimethylamine borane (DMAB), diethylamine borane (DEAB), amine borane, and sodium borohydride, in accordance with one aspect of the subject disclosure. In accordance with another aspect of the subject disclosure, the one or more complexors may comprise one or more of citric acid, malic acid, lactic acid, amino acids, tartaric acid, ethylenediaminetetraacetic acid (EDTA), a carboxylic acid, and any salt thereof.

According to one aspect of the subject disclosure, the one or more stabilizers may comprise one or more cations of Bi, Cd, Cu, Hg, In, Mo, Pb, Sb and Sn, $AsO^{-2}$, $MoO^{-4}$, $IO_3^-$, $NO_3^-$, maleic acid, itaconic acid, methylbutynol, N,N-Diethyl-2-propyne-1-amine and 2-Butyne-1,4-diol. According to another aspect of the subject disclosure, the one or more stabilizers may comprise iodine or a compound thereof. The stabilizers may help to prevent the decomposition of the bath (e.g., by preventing nucleation of nickel particles in the bath).

The one or more pH adjusting additives may comprise one or more of $K_2CO_3$, $Na_2CO_3$, $KHCO_3$, $NaHCO_3$, NaOH, KOH, $NH_4OH$ and $N(CH_2CH_3)_3$, in accordance with one aspect of the subject disclosure. In accordance with another aspect of the subject disclosure, the one or more pH adjusting additives may comprise a buffer selected from the group consisting of boric acid, borax, triethanolamine, triethylene pentamine, diethylenetriamine, acetate salts, propionate salts, succinate salts, and adipate salts.

In accordance with one aspect of the subject disclosure, the plating bath may further comprise one or more dispersants, anionic surfactants, nonionic surfactants, and organosulfur compounds.

In step 204, the coating layer may be polished with a slurry comprising an abrasive in an aqueous solution, in accordance with one aspect of the subject disclosure. The abrasive may include, for example, one or more of nanodiamond, alumina, titania, zirconia, germania, silica, ceria and any mixture thereof. The pH of the slurry may be maintained between 3 and 9 during the polishing.

According to one aspect of the subject disclosure, the slurry may further comprise an oxidizing agent, a complexing agent, and one or more organic amino compounds. The oxidizing agent may include, for example, one or more peroxy compounds (e.g., hydrogen peroxide), urea, permanganates, nitrates, and iodates. The complexing agent may include, for example, one or more of citric acid, lactic acid, tartaric acid, succinic acid, malonic acid, oxalic acids, amino acids or salts thereof. The organic amino compounds may include, for example, triethanolamine or the like.

According to one aspect of the subject disclosure, the slurry may further include a corrosion inhibitor comprising benzotriazole or benzoylphenylhydroxylamine. According to another aspect of the subject disclosure, the slurry may further include a stabilizer comprising one or more of ammonium lauryl sulfate, sodium dodecyl sulfate, and sodium lauryl sulfate.

According to one experimental embodiment of the subject disclosure, AlMg disks coated with the a Ni—$X_1$—P coating with a thickness of about 10 μm were polished using an exemplary polishing process that included an acidic polishing step at pH of about 2 and a second polishing step at a pH of about 9. Colloidal silica and/or nano-diamond were used as the abrasive in the second polishing step. In order to avoid chemical attack, the second step polishing slurry did not contain aggressive oxidizers, such as $H_2O_2$. The second polish step proceeded with a very low removal rate of <0.02 μm/min and left the Ni—$X_1$—P surface, after a wash step using conventional surfactants, smooth and defect free (e.g., with a $R_a$ measured by AFM of 0.2 nm over a 10×10 μm area). Corrosion of the Ni—$X_1$—P coating was not observed.

According to various experimental embodiments of the subject disclosure, polished AlMg/Ni—$X_1$—P (e.g., where $X_1$=Cu, CuMo, or CuIn) disks have proven to exhibit an increased thermal stability when compared to conventional NiP-coated AlMg disks. Temperature dependent magnetic measurements on exemplary AlMg disks coated with Ni—Cu—P showed that the addition of Cu to the coating alloy helped to quench the magnetism of Ni which develops in the conventional NiP coating at higher temperatures (e.g., higher than 340° C.) due to the crystallization and crystal growth of Ni. This was demonstrated when disks were cycled through a multi module manufacturing-type sputtering machine and heated in vacuum (at $10^{-7}$ to $10^{-8}$ Torr) to a temperature of about 450° C. The disks were held at the OD by spring-loaded stainless steel pins. The pins held the disks fixed in a paddle which was driven through the sputtering machine to subsequent deposition, heating and cooling modules. The heater station was equipped with two resistance heater coils heating each side of the disks by radiation. No additional coatings were applied to the disks for the test. Each disk's surface temperature was measured by a high temperature pyrometer, which probed the disk surface immediately after it was transferred out of the heater chamber. A heater power of about 1300 W was applied for about 10 s to increase the disk temperature to about 450° C. After heating, the disk was transferred out of the sputtering machine without passing a cooling station. None of the disks were warped, showed OD dings or other damage induced by the heat. The coatings on conventional AlMg/Ni—P disks had a hazy appearance after the test indicating a substantial increase in surface roughness (as was subsequently confirmed by AFM). Surfaces of disks with the Ni—$X_1$—P coating remained shiny and specular. AFM Ra measurements on those disks confirmed that the coating did not degrade at temperatures of about 450° C.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A method of forming a disk for a hard disk drive, the method comprising:
    providing a substrate comprising aluminum;
    disposing a zincate layer over the substrate; and
    electroless plating a coating layer over the zincate layer, the coating layer comprising an alloy of Ni, $X_1$ and $X_2$,
        wherein $X_1$ comprises Cu and an element selected from the group consisting of B, In, Mo, and W,
    wherein $X_2$ comprises either B or P,
    wherein $X_1$ and $X_2$ do not comprise the same elements, and
    wherein the alloy comprises between about 1.5 and about 42 weight percent of each constituent of $X_1$ and between about 3 and about 11 weight percent $X_2$.

2. The method according to claim 1, wherein the electroless plating the coating layer comprises:
    disposing the substrate in a plating bath comprising:
        one or more metal sources for each of Ni and $X_1$,
        a reducing agent for reducing the one or more metal sources, the reducing agent comprising $X_2$,
        one or more complexors to reduce metal precipitation,
        one or more stabilizers, and
        one or more pH adjusting additives.

3. The method according to claim 2, wherein the plating bath has a pH of between about 5 and about 9.

4. The method according to claim 2, wherein the plating bath is maintained at a temperature between about 160° F. and about 195° F. while the substrate is disposed in the plating bath.

5. The method according to claim 2, wherein the plating bath has a metal turn over (MTO) of less than 6.

6. The method according to claim 5, wherein the MTO of the plating bath is maintained between about 2.0 and 4.5.

7. The method according to claim 2, wherein the one or more metal sources for Ni comprise one or more of nickel sulfate, nickel sulfamate, nickel acetate, nickel chloride, nickel hypophosphite, and nickel fluor-borate.

8. The method according to claim 2, wherein the one or more metal sources for $X_1$ comprise one or more of copper sulfate, copper iodate, copper iodide, and copper chloride.

9. The method according to claim 2, wherein the reducing agent comprises one or more of salts of hypophosphite, nickel hypophosphite, dimethylamine borane (DMAB), diethylamine borane (DEAB), amine borane, and sodium borohydride.

10. The method according to claim 2, wherein the one or more complexors comprise one or more of citric acid, malic acid, lactic acid, amino acids, tartaric acid, ethylenediaminetetraacetic acid (EDTA), a carboxylic acid, and any salts there.

11. The method according to claim 2, wherein the one or more stabilizers comprise one or more cations of Bi, Cd, Cu, Hg, In, Mo, Pb, Sb and Sn, $AsO^{-2}$, $MoO^{-4}$, $IO_3^-$, $NO_3^-$, maleic acid, itaconic acid, methylbutynol, N,N Diethyl 2 propyne 1 amine and 2 Butyne 1,4 diol.

12. The method according to claim 2, wherein the one or more stabilizers comprise iodine or a compound thereof.

13. The method according to claim 2, wherein the one or more pH adjusting additives comprise one or more of $K_2CO_3$, $Na_2CO_3$, $KHCO_3$, $NaHCO_3$, NaOH, KOH, $NH_4OH$ and $N(CH_2CH_3)_3$.

14. The method according to claim 2, wherein the one or more pH adjusting additives comprise a buffer selected from the group consisting of boric acid, borax, triethanolamine, triethylene pentamine, diethylenetriamine, acetate salts, propionate salts, succinate salts, and adipate salts.

15. The method according to claim 2, wherein the plating bath further comprises one or more dispersants, anionic surfactants, nonionic surfactants, and organosulfur compounds.

* * * * *